United States Patent [19]
Mo et al.

[11] Patent Number: 5,558,007
[45] Date of Patent: Sep. 24, 1996

[54] APPARATUS FOR MAKING THIN AND CONTINUOUS WRAPPING SHEETS

[76] Inventors: Yoke K. Mo, deceased, late of Palo Alto, Calif.; by Ngoc U. Mo, legal heir, 175 Demeter St., East Palo Alto, Calif. 94303

[21] Appl. No.: 560,656

[22] Filed: Nov. 20, 1995

[51] Int. Cl.⁶ .............. A21B 1/46; A21C 9/06; A21C 11/00; A23P 1/00
[52] U.S. Cl. .............. 99/326; 99/353; 99/355; 99/450.2; 99/450.6; 425/223; 425/436 R
[58] Field of Search ............ 99/325–332, 353–356, 99/348, 352, 483, 450.1–450.7; 425/223, 217, 436 R, 321, 335

[56]                  References Cited

U.S. PATENT DOCUMENTS

| | | | |
|---|---|---|---|
| 2,718,972 | 9/1955 | Temple | 414/152 |
| 2,899,914 | 8/1959 | Arsdell | 99/325 |
| 3,112,528 | 12/1963 | Czcrkas | 425/224 X |
| 3,537,404 | 11/1970 | Rohrbacher et al. | 99/355 X |
| 3,556,805 | 3/1971 | Meyer | 99/450.6 |
| 3,565,014 | 2/1971 | Mendoza | 425/223 X |
| 3,669,007 | 6/1972 | Pulici | 99/450.6 |
| 3,930,441 | 1/1976 | Ohkawa | 99/450.6 |
| 4,996,915 | 3/1991 | Morikawa et al. | 99/450.2 |

*Primary Examiner*—Timothy F. Simone
*Attorney, Agent, or Firm*—Bo-In Lin

[57]                    ABSTRACT

This is an invention of a machine for making a thin and continuous food wrapping sheet from a batter. The machine includes a first rotating drum which has a heating surface. The machine further includes a batter spreading opening located near the first rotating drum for spreading the batter on the heating surface on the first rotating drum for forming a food wrapping sheet on the heating surface. The wrapping sheet hanging downwardly along a tangential direction from the heating surface. The machine further includes a second rotating drum and a conveying guide tube for receiving the wrapping sheet from the first rotating drum and for transporting the wrapping sheet to the second rotating drum for wrapping around a sheet collecting surface on the second rotating drum. The machine further includes a blowing and stretching fan located near the first rotating drum for generating an air flow to blow on the wrapping sheet hanging downwardly from the first rotating drum and to blow the wrapping sheet away from the conveying guiding tube for generating a tension on the wrapping sheet for drying and stretching the wrapping sheet.

7 Claims, 2 Drawing Sheets

APPARATUS FOR MAKING THIN AND CONTINUOUS WRAPPING SHEETS

BACKGROUND OF THE INVENTION

1. Field of the Invention

This invention relates generally to the apparatus and method for food processing in making wrapping sheets. More particularly, this invention relates to an improved wrapping sheet apparatus and method for making thin and continuous wrapping sheets which is suitable for cutting and packaging into various sizes thus are very convenient for sale as a marketable packages.

2. Description of the Prior Art

As food processing machines becomes popular, they have been broadly employed in making many different kinds of food products, several prior art patents disclose apparatus and methods for making dough or dough sheets. Rohrbacher et al. disclose in U.S. Pat. No. 3,537,404 entitled "Pastry Forming Apparatus and Method" (issued on Nov. 3, 1970), an apparatus and method for automatically and continuously providing individual filled pastries. The apparatus and method are for preparing foodstuffs such as blintzes, crepe suzettes and other similar pastries. It discloses a method to process batter to provide a layer of liquid of uniform width and thickness for individual pastry leaves. The use of drums to pick up liquid batter by surface adhesion is disclosed. But the liquid picked by the rotating drum is then deposited on a conveyor as a web to be cooked on the conveyor. It does not teach a technique to make long and continuous sheet suitable for making packaged wrapping sheets of different sizes suitable for sale on the market thus allowing an end user to apply these wrapping sheets for various individual purposes.

In another U.S. Pat. No. 3,566,805, entitled "Pastry Product Production System" (issued on Mar. 2, 1971), Meyer discloses a pastry production system for programmed sheeting, forming, cutting and finishing operations. A sheeting means is employed for receiving pastry dough and rolling it into continuous sheet. The system also includes variable speed driving means, makeup conveyor means for receiving the dough sheet. A control unit is used to control and synchronize the operations. Meyer's system includes several 'sheeting means' to make continuous sheet and the thickness of the sheet is controlled by complicated variable speed driving means. Meyer's system is not only very complicate and expensive, it also requires the process to begin with a dough which requires separate processes before Meyer's system can be applied to make the continuous sheet. Meyer's system still does not provide an automated and practical system to conveniently make continuous sheet which would enable one to make packaged wrapping sheets of various sizes for sale on the market.

In U.S. Pat. No. 3,930,441 entitled "Device for Processing Dough" (issued on Mar. 12, 1974), Ohkawa discloses a device for processing dough. Dough sheets are formed and baked by injecting the dough in a hopper from a flat nozzle by a gear pump in an longitudinal oscillating manner which moves toward and away from a rotating drum periodically. The drum is heated and the dough sheet is baked on it. The dough sheet is then released from the drum by a releasing plate in contact with the drum. Again, this process has to begin with the dough that is performed. Additionally, the apparatus as disclosed by Ohkawa does not provide a means to make continuous sheet for cutting into various sizes suitable for flexible applications.

Morikawa et al. disclose in U.S. Pat. No. 4,996,915 entitled "Apparatus for Producing A Dough Roll" (issued on Mar. 5, 1991) an apparatus for producing a dough roll. The problems in producing croissants or butter rolls with irregularly shaped dough rolls due to the deviation of the center line of a dough piece from the direction of the advancing conveyor for conveying the dough thereon are eliminated. A pair of vertically juxtaposed rollers including a upper roller and a lower roller are provided to prevent lateral deformation of the rear portion of the dough piece where it passes between the pair of rollers. Morikawa's apparatus provides a useful configuration for making individual dough rolls. The process has to start with pre-formed dough. Also, it does not teach a method or provide a technique to resolve the difficulties in making continuous wrapping sheet.

Therefore, a need still exists in the art of food processing to provide an apparatus and teach a method to produce continuous dough sheet directly from flour, wherein the continuous wrapping sheets are suitable for cutting into different sizes for various applications. Particularly, there is a need for producing such continuous dough sheet of uniform thickness and of durable strength to sustain further processing such as deep flying.

SUMMARY OF THE PRESENT INVENTION

It is therefore an object of the present invention to provide a new technique for making continuous dough sheets which may be cut into various sizes thus enabling those of ordinary skill in the art to overcome the aforementioned difficulties and limitations encountered in the prior art.

Specifically, it is an object of the present invention to provide a new apparatus and method for making continuous dough sheets with such even thickness and of enough strength to sustain further processing such as deep frying and boiling, etc.

Another object of the present invention is to provide a new apparatus for making continuous dough sheets wherein the apparatus is simple in structure, easy to control and can produce the dough sheets at very low cost.

Another object of the present invention is to provide a new apparatus for making continuous dough sheets wherein the dough sheets are made with very uniform and small thickness which are suitable for making broad variety of foods.

Briefly, in a preferred embodiment, the present invention includes an apparatus for making a thin and continuous food wrapping sheet from a batter. The apparatus includes a first rotating drum which has a heating surface. The apparatus further includes a batter spreading means disposed near the first rotating drum for spreading the batter on the heating surface on the first rotating drum for forming a food wrapping sheet on the heating surface wherein the wrapping sheet hanging downwardly along a tangential direction from the heating surface. The apparatus further includes a second rotating drum and a conveyor belt for receiving the wrapping sheet from the first rotating drum and for transporting the wrapping sheet to the second rotating drum for wrapping around a sheet collecting surface on the second rotating drum. The apparatus further includes a blowing and stretching means disposed near the first rotating drum for generating an air flow to blow on the wrapping sheet hanging downwardly from the first rotating drum and to blow the wrapping sheet away from the conveyor belt for generating a tension on the wrapping sheet for drying and stretching the wrapping sheet.

It is an advantage of the present invention that it provides a new apparatus and method for making continuous dough sheets directly from flour wherein the sheets may be cut into various sizes.

Another advantage of the present invention is that it provides a new apparatus and method for making continuous dough sheets with even thickness and of enough strength to sustain further processing such as deep flying and boiling, etc.

Another advantage of the present invention is that it provides a new apparatus for making continuous dough sheets wherein the apparatus is simple in structure, easy to control and can produce the dough sheets at very low cost.

Another advantage of the present invention is that it provides a new apparatus for making continuous dough sheets wherein the dough sheets are made with very uniform and small thickness which are suitable for making broad variety of foods.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
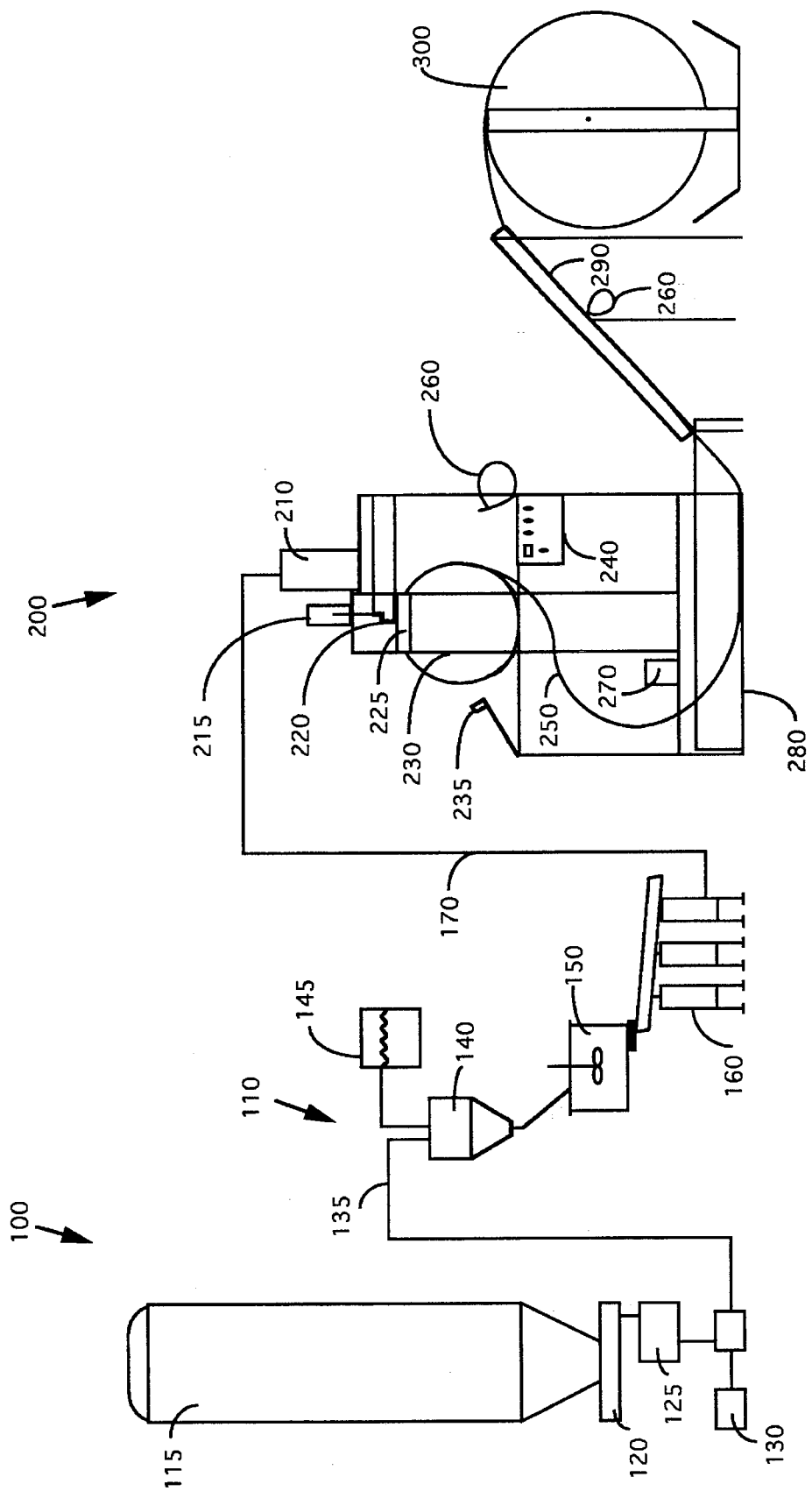
FIG. 1 is a functional block diagram of an apparatus for making wrapping sheet according to the present invention.

FIG. 1 is a functional block diagram showing the processing stages of a food processor 100 for making continuous sheets of the present invention. The food processor 100 includes two major parts, i.e., a batter processing stage 110 and a wrapping sheet processing stage 200. The batter processing stage 110 includes a flour silo 115 having a shape of an elongated cylindrical tank for feeding and storing flour. The silo 115 has a tapered lower end for connecting to a screw-controlled out let 120 to control the amount of flour release from the silo. The flour released form the silo 115 through the outlet 120 is directed by a pneumatic system 130 to first pass through a sifting means 125 and then transport via flour transporting tube 135 to a weighing silo 140. The weighing silo 140 weighs the flour transported into the weighing silo and provides a feed back signal to the pneumatic system 130 for controlling the transportation of the flour into the weighing silo 140 through the transporting tube 135. Based on the weight of the flour measured by the weighing silo, a fixed amount of water is pored in from a water supply system 145. The mixture of water and flour is then flow down from the weighing silo 140 to a mixer 150 to form a uniform mixture of flour and water therein. The uniform mixture of flour and water formed in the mixer 150 is further processed by a series of grinders 160. In a preferred embodiment, the grinders 160 are adapted by the use of regular meat grinders which are readily available in the market to reduce the cost of customization of the system. The dual steps, performed by the mixture 150 and grinder 160, to mix and grind the flour-water mixture for batter preparation process assure that all the inhomogeneous flour pellet or coarse particles in the batter are pulverized. The pulverized mixture of flour and water, formed as batter for making food wrapping sheets is now formed as semi-liquid form and transported through a transport tube 170 to the wrapping processing stage 200 for further process.

The processed batter transported from batter processing stage 100 via the transporting tube 170 is first transported into an intake reservoir 210 which is formed as a rectangular container with a bottom opening. From this bottom opening, a controlled amount of batter is released by a control and sweeping opening 220 letting the batter flow to a drum spreading opening 225. The control and sweeping mechanism 220 also includes a chopping pressurizing mechanism 215 for removing the gluten from the batter and for exerting a pressure to push a uniform layer of batter to flow out from the opening at the bottom of the reservoir 210. The detail structure of the chopping pressurizing mechanism 215, the control and sweep mechanism 220, and the drum spreading opening 225 are shown in FIG. 2 below.

The batter flows down to the drum spreading mechanism 225 is spread over the surface of a first rotating drum 230 as a thin layer with controlled thickness. The thickness of the layer is determined by the controlled amount of batter release from the reservoir 210 controlled by the control and sweeping mechanism 220. This thin layer of batter spread over the surface of the first rotating drum 230 is heated and cooked with the heat provided to the surface of the first drum 230 by the heaters built in the center portion of the drum (not shown) wherein the power supply to the heaters are provided and controlled by a heating controller 240. In addition to the heaters in the first drum, the wrapping sheet processing stage 200 also includes an auxiliary heater 245 which is also controlled by the heating controller 240 to provide additional heat to the thin layer batter spread over the first rotating drum 230 to formed a cooked thin layer wrapping sheet. This cooked thin layer of wrapping sheet is formed as a continuous wrapping sheet 250 which hangs tangential downwardly.

As the continuous wrapping sheet 250 hangs over the first rotating drum 230 and dropping perpendicular to the ground, a blowing stretching fan 260 is employed to blow over the sheet 250. The sheet 250 is blown and swaying away from the fan 260 to the left as shown thus creating a tension and the tension generated by this blowing stretching fan 260 thus stretching the sheet 250. As the sheet 250 are blown toward the left and then gradually dropping down because of the gravitational force, it curves around a relay 270 and then reaching down to touch the bottom of a sheet guiding trough 280. The wrapping sheet 250 is further extended along the bottom surface of the guiding trough 280 and guided by a second guiding trough 290 to reach a second rotating drum 300. The second rotating drum 300 then pull the sheet 250 up to wrap around the surface of the second rotating drum 300. The rotation of the second rotating drum 300 is controlled by the relay 270. When the sheet 250 is being blown to the left and not touching the relay 270, the second rotating drum 300 is actuated to rotate at a certain speed which is slightly faster then the rotation of the first rotating drum 230. Because the sheet 250 is being pulled by the second rotating drum 300 at a higher speed, there is a force to pull the sheet 250 to the right. Soon as the wrapping sheet 250 touches the relay, the rotation of the second rotating drum 300 stops. By controlling the rotational speeds of the first and second rotation drums 230 and 300, the strength of wind blowing out from the blowing fan 260 and the position of the relay, the tension of the wrapping sheet 250 can be precisely controlled to make a thin layer of continuous wrapping sheet 250 with precise thickness.

Figure 2:
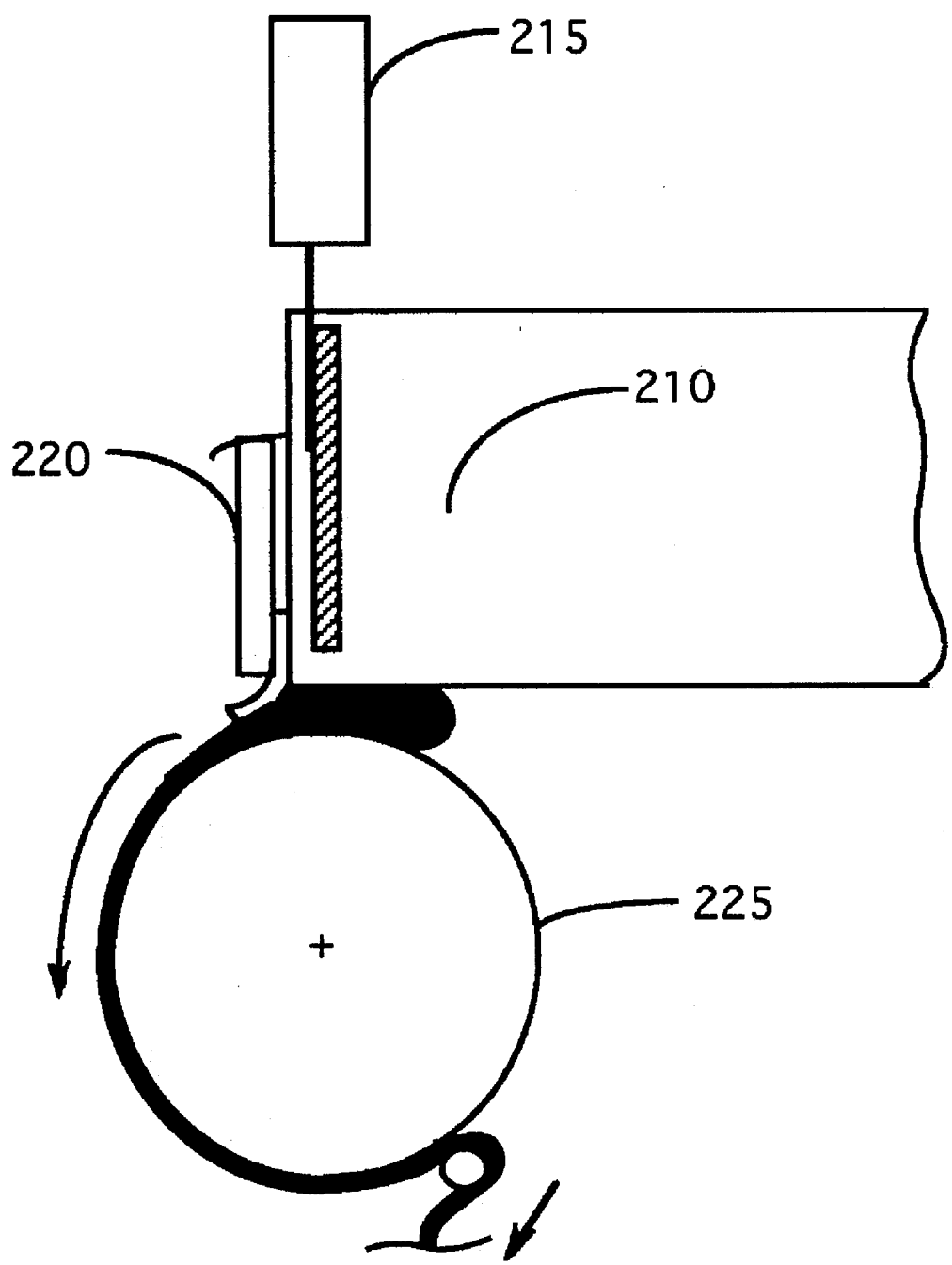
FIG. 2 is a perspective view for the structure of the chopping pressurizing mechanism, the control and sweep mechanism, and the drum spreading mechanism of the apparatus of FIG. 1.

FIG. 2 is a cross sectional view to show the detail structures and functions of the chopping pressurizing mechanism 215, the control and sweep mechanism 220, and the drum spreading opening 225. The chopping pressurizing mechanism 215 includes a chopping extension extends downwardly to the bottom of the reservoir 210 with the batter stored therein. The chopping pressurizing mechanism 215 moves up and down continuously. The vertical movement of the chopping pressurizing mechanism further refines the batter by crushing on the gluttons in the batter through the chopping action. The vertical movement of the chopping extension further generates a low pressure zone near the batter spreading opening 225 on the bottom of the batter reservoir 210 thus causes the batter to flow out from the spreading opening 225. The height of the batter spreading opening 225 is controlled by the control and sweeping mechanism 220 which has a controls the height of the opening 225 to control the rate of batter flows out of the reservoir to be spread over the first rotating drum 230 which in turn controls the thickness of the wrapping sheet. The control and sweeping mechanism 220 further includes a sweeping means to continuously sweep horizontally over the surface of the batter flow thus assures the batter flow spread evenly over the entire horizontal length of the batter spread opening 225 to spread the batter onto the surface of the first rotating drum 230.

Therefore, the present invention discloses an apparatus for making a thin and continuous food wrapping sheet from a batter. The apparatus includes a batter processing stage 100 for preparing the batter by evenly mixing a flour with an amount of water, the processing stage 100 includes a grinding means 150 employing a regular meat grinder for grinding the batter to produce batter for containing a plurality of uniform fine flour particles. The apparatus further includes a first rotating drum 230 includes a heating surface which has a temperature control means for controlling a temperature of the heating surface on the first rotating drum 230. The apparatus further includes a batter storing and spreading means 210 disposed right above the first rotating drum 230 includes a reservoir 210 for storing the batter therein and a spreading opening 220 in a bottom portion of the reservoir 210 above the first rotating drum 230 for spreading the batter onto the heating surface of the first rotating drum 230 for forming a food wrapping sheet on the heating surface. The wrapping sheet 250 hanging downwardly along a tangential direction from the heating surface. The spreading opening 220 in the bottom portion of the reservoir 210 is an opening extends horizontally over the heating surface of the first rotating drum 230 for evenly spread the batter thereon. The batter storing and spreading means 210 further includes a chopping and pressurizing means 215 disposed near the opening 220 for chopping the batter by continuous up-down movements thus generating a low pressure zone therein for enhancing the batter to flow out from the opening 220. The batter storing and spreading means 210 further includes a control and sweeping means 225 disposed right above the opening for adjusting an area of the opening 220 for controlling an amount of the batter to spread onto the heating surface, the control and sweeping means 225 further sweeping horizontally to assure the batter distributing evenly over an entire length of the opening to produce an uniform thickness in the wrapping sheet 250. The apparatus further includes a second rotating drum. The apparatus further includes a rotation control means for controlling a rotation speed of the first rotating drum and a rotation speed of the second rotating drum. The apparatus further includes a conveying guide tube 290 for receiving the wrapping sheet 250 from the first rotating drum 230 and for guiding the wrapping sheet 250 to second rotating drum 300 for wrapping around a sheet collecting surface on the second rotating drum. The apparatus further includes a blowing and stretching means 260 disposed below the first rotating drum 230 for generating an air flow to blow on the wrapping sheet 250 hanging downwardly from the first rotating drum 230 and to blow the wrapping sheet 250 away from the conveying guide tube 290 for generating a tension on the wrapping sheet 250 for drying and stretching the wrapping sheet 250. The apparatus further includes a contact relay means 270 for deactivating a rotation of the second rotating drum 300, the relay means 270 is disposed near the wrapping sheet 250 hanging downwardly from the first rotating drum 230 opposite the blowing and stretching means 260 wherein the blowing and stretching means 260 blowing the wrapping sheet 250 away from the contact relay means 270 while the rotation of the second rotation drum 300 drawing the wrapping sheet 250 closer and causing a contact with the contact relay means 270 thus deactivating the rotation of the second rotating drum 300. Then the blowing and stretching means 270 blowing the wrapping sheet 250 away from the contact relay means 270 to reactivate the rotation of the rotating drum 300.

Therefore, the present invention provides a new technique for making continuous wrapping sheets which may be cut into various sizes with flexibility to use the wrapping sheets to make different types of foods. The continuous wrapping sheets made by the use of the apparatus and method are provided with such even thickness and of enough strength to sustain further processing such as deep flying and boiling, etc. Furthermore, the apparatus as disclosed in this invention is simple in structure, easy to control and can produce the dough sheets at very low cost. The present invention also provides a new apparatus for making continuous wrapping sheets wherein the sheets are made with very uniform and small thickness which are suitable for making broad variety of foods.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An apparatus for making a thin and continuous food wrapping sheet from a batter comprising:

a first rotating drum includes a heating surface;

a batter storing and spreading means disposed right above said first rotating drum for spreading said batter on said heating surface on said first rotating drum for forming a food wrapping sheet on said heating surface wherein said wrapping sheet hanging downwardly along a tangential direction from said heating surface;

a second rotating drum;

a rotation control means for controlling a rotation speed of said first rotating drum and a rotation speed of said second rotating drum;

a conveying guide tube for receiving said wrapping sheet from said first rotating drum and for guiding said wrapping sheet to second rotating drum for wrapping around a sheet collecting surface on said second rotating drum; and a blowing and stretching means disposed below said first rotating drum for generating an air flow to blow on said wrapping sheet hanging downwardly from said first rotating drum and to blow said wrapping sheet away from said conveying guide tube for generating a tension on said wrapping sheet for drying and stretching said wrapping sheet.

2. The apparatus for making wrapping sheet of claim 1 further comprising:

a contact relay means for deactivating a rotation of said second rotating drum, said relay means disposed near said wrapping sheet hanging downwardly from said first rotating drum opposite said blowing and stretching means wherein said blowing and stretching means blowing said wrapping sheet away from said contact relay means while said rotation of said second rotation drum drawing said wrapping sheet closer and causing a contact with said contact relay means thus deactivating said rotation of said second rotating drum, then said blowing and stretching means blowing said wrapping sheet away from said contact relay means to reactivate said rotation of said rotating drum.

3. The apparatus for making wrapping sheet of claim 2 further comprising:

a temperature control means for controlling a temperature of the heating surface on said first rotating drum.

4. The apparatus for making wrapping sheet of claim 3 wherein:

said batter storing and spreading means further includes a reservoir for storing said batter therein and a spreading opening in a bottom portion of said reservoir above said first rotating drum for spreading said batter onto said heating surface of said first rotating drum.

5. The apparatus for making wrapping sheet of claim 4 wherein:

said spreading opening in said bottom portion of said reservoir is an opening extends horizontally over said heating surface of said first rotating drum for evenly spread said batter thereon;

said batter storing and spreading means further includes a chopping and pressurizing means disposed near said opening for chopping said batter by continuous up-down movements thus generating a low pressure zone therein for enhancing said batter to flow out from said opening; and said batter storing and spreading means further includes a control and sweeping means disposed right above said opening for adjusting an area of said opening for controlling an amount of said batter to spread onto said heating surface, said control and sweeping means further sweeping horizontally to assure said batter distributing evenly over an entire length of said opening to produce an uniform thickness in said wrapping sheet.

6. The apparatus for making wrapping sheet of claim 5 further comprising:

a batter processing stage for preparing said batter by evenly mixing a flour with an amount of water; and said processing stage further includes a grinding means wherein a regular meat grinder is used to grind said batter to produce batter with a plurality of uniform fine flour particles.

7. An apparatus for making a thin and continuous food wrapping sheet from a batter comprising:

a batter processing stage for preparing said batter by evenly mixing a flour with an amount of water, said processing stage includes a grinding means employing a regular meat grinder for grinding said batter to produce batter for containing a plurality of uniform fine flour particles;

a first rotating drum includes a heating surface;

a temperature control means for controlling a temperature of the heating surface on said first rotating drum;

a batter storing and spreading means disposed right above said first rotating drum includes a reservoir for storing said batter therein and a spreading opening in a bottom portion of said reservoir above said first rotating drum for spreading said batter onto said heating surface of said first rotating drum for forming a food wrapping sheet on said heating surface wherein said wrapping sheet hanging downwardly along a tangential direction from said heating surface;

said spreading opening in said bottom portion of said reservoir is an opening which extends horizontally over said heating surface of said first rotating drum for evenly spreading said batter thereon;

said batter storing and spreading means further includes a chopping and pressurizing means disposed near said opening for chopping said batter by continuous up-down movements thus generating a low pressure zone therein for enhancing said batter to flow out from said opening; and said batter storing and spreading means further includes a control and sweeping means disposed right above said opening for adjusting an area of said opening for controlling an amount of said batter to spread onto said heating surface, said control and sweeping means further sweeping horizontally to assure said batter distributing evenly over an entire length of said opening to produce an uniform thickness in said wrapping sheet;

a second rotating drum;

a rotation control means for controlling a rotation speed of said first rotating drum and a rotation speed of said second rotating drum;

a conveying guide tube for receiving said wrapping sheet from said first rotating drum and for guiding said wrapping sheet to second rotating drum for wrapping around a sheet collecting surface on said second rotating drum;

a blowing and stretching means disposed below said first rotating drum for generating an air flow to blow on said wrapping sheet hanging downwardly from said first rotating drum and to blow said wrapping sheet away from said conveying guide tube for generating a tension on said wrapping sheet for drying and stretching said wrapping sheet; and a contact relay means for deactivating a rotation of said second rotating drum, said relay means disposed near said wrapping sheet hanging downwardly from said first rotating drum opposite said blowing and stretching means wherein said blowing and stretching means blowing said wrapping sheet away from said contact relay means while said rotation of said second rotation drum drawing said wrapping sheet closer and causing a contact with said contact relay means thus deactivating said rotation of said second rotating drum, then said blowing and stretching means blowing said wrapping sheet away from said contact relay means to reactivate said rotation of said rotating drum.

* * * * *